Dec. 28, 1954  P. J. BILY  2,698,192
SWIVEL JOINT CONSTRUCTION FOR HANDLING FLUIDS
Filed March 30, 1951  2 Sheets-Sheet 1
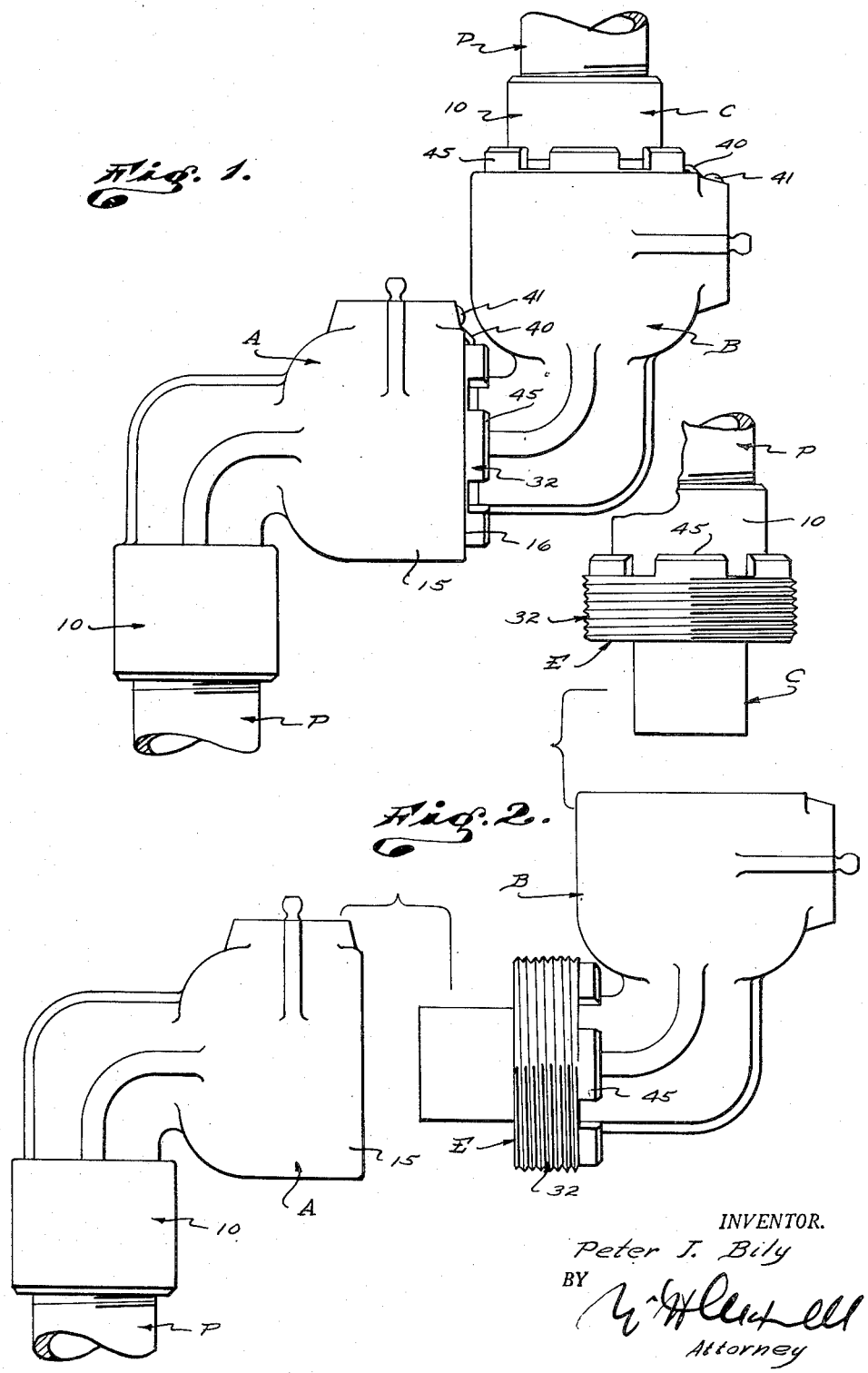
INVENTOR.
Peter J. Bily
BY
Attorney

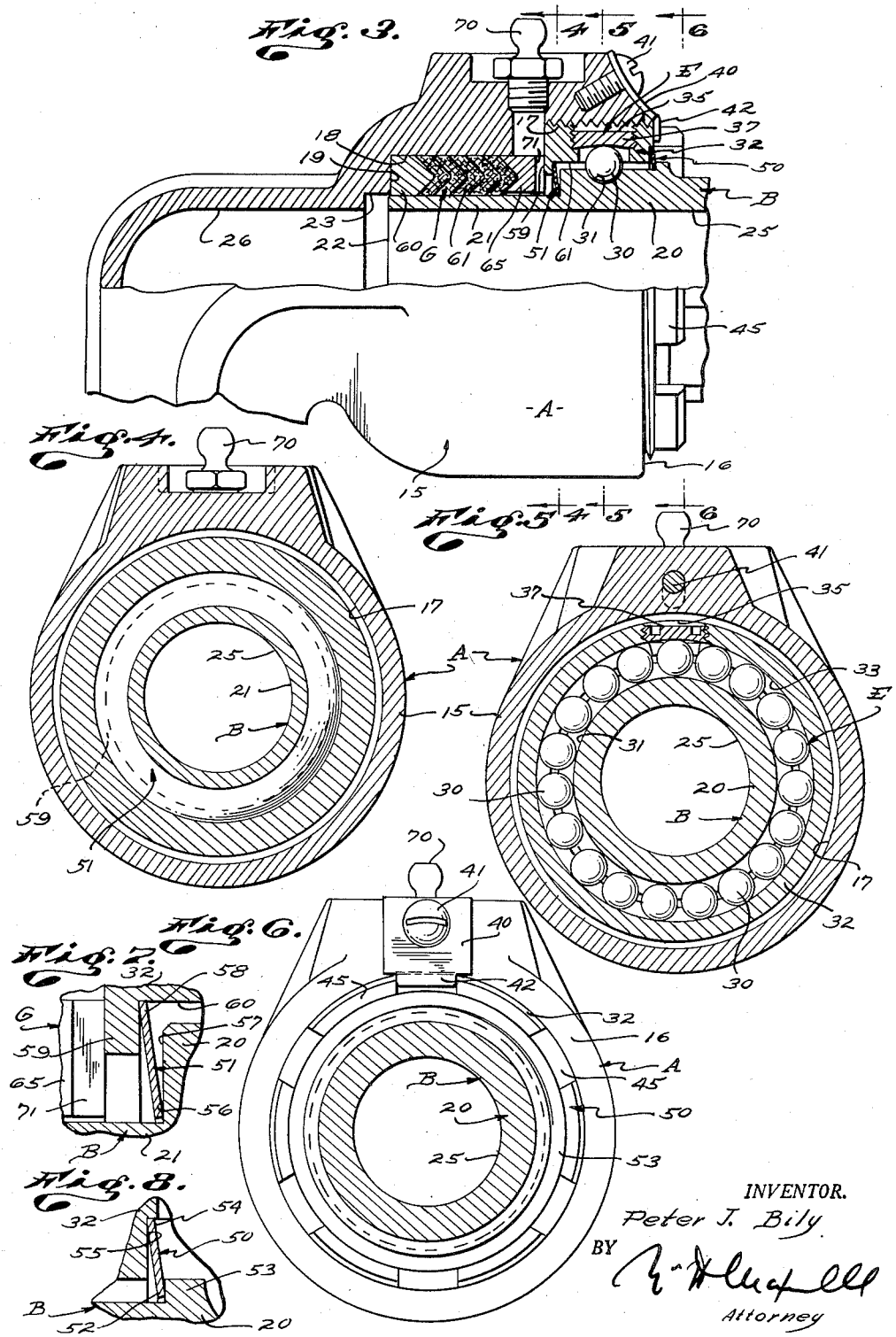

United States Patent Office 2,698,192
Patented Dec. 28, 1954

2,698,192

SWIVEL JOINT CONSTRUCTION FOR HANDLING FLUIDS

Peter J. Bily, Brea, Calif., assignor to Chiksan Company, Brea, Calif., a corporation of California Application March 30, 1951, Serial No. 218,485

3 Claims. (Cl. 285—97.3)

This invention relates to a joint construction for handling fluids, and it is a general object of the invention to provide a simple practical improved sectional structure, and an improved simplified joint by which adjoining elements of such a structure are connected for relative rotation.

It is a general object of this invention to provide a construction or assembly involving a plurality of sections that are tubular and such as to handle fluid, which sections are adapted to connect to pipes, or the like, enabling them to tilt or rock relative to each other and enabling one of them to rotate freely about its longitudinal axis regardless of its position relative to the other.

Another object of this invention is to provide a simple practical effective joint construction wherein two sections are engaged for relative rotation and wherein there is a bearing relating the sections so they operate freely relative to each other, which bearing is related to one section against shifting axially thereof and is related thereto in a direction axial thereof.

It is another object of the invention to provide a joint construction of the general character referred to wherein the bearing is of simple compact dependable construction and is such that it may be so applied or engaged thereon or assembled therewith when the sections are separated.

Another object of the invention is to provide a joint construction of the general character referred to in which there is a packing engaged between the sections to prevent leakage of the fluid handled, which packing is held engaged or under pressure by or through the bearing and can, from time to time, be operated or further compressed by adjustment of the bearing.

The structure that I have provided involves a plurality of tubular flow handling sections, one a female section having a pipe receiving part at its outer end, another a combined male and female section, and another a male section with a pipe receiving part at its outer end. The female or socket elements of the several sections are preferably alike, as are the male parts or elements of the sections, and the sections are assembled so that the female section received the male element of the combined male and female section, while the female element of the combined male and female section receives the male element of the male section. As to the male and female sections, it is preferred that one be simple and straight while the other is L-shaped, and as to the combined male and female section, it is preferably L-shaped. As a result of this combination and arrangement, pipes connected to or engaged with the pipe receiving parts on the male and female sections, are in spaced parallel planes, are subject to be rocked or swung about an axis transverse of said planes, and one of the pipes is free to rotate about its longitudinal axis regardless of the relative positions of the pipes. In accordance with the invention, the several male elements are alike and the several female elements are alike, so that the joints established by these elements are alike.

At each joint, the female element has a body with a socket therein, the socket being formed by a bore entering the exposed end of the body and a counterbore of reduced diameter that continues inward from the bore to terminate at a bottom. The male element has a main portion that occurs in the bore and may be substantially coextensive therewith axially of the joint, while a pin section projects from the main section to extend into and preferably through the counterbore. A bearing, preferably an anti-friction bearing, supports the male element in the female element, and, in a preferred form, it is an anti-friction bearing and it may involve an annular series of balls carried in an annular channel in the exterior of the main section of the male element. A race ring surrounds the main section of the male element and has an internal channel receiving the balls. An access opening is provided in the ring from the exterior thereof to communicate with the channels so that the balls can be easily arranged in and removed from the channels. The opening is normally closed by a removable plug. In the preferred arrangement the race ring is shiftable or adjustable lengthwise of the female element, and, in practice, it is desirable to thread the race ring into the bore of the female element. Sealing rings are provided at each end of the bearing and a lock means is provided for setting the race ring in adjusted position. A packing means is provided between the elements and preferably involves packing in the counterbore and around the pin portion of the male element. A follower of the packing means is engaged by the race ring of the bearing so that as the race ring is advanced in the bore, the follower is advanced in the counterbore and consequently exerts pressure on the packing. A fitting is provided, preferably on the female element, and passes lubricant into the counterbore and to the packing located therein.

The various objects and features of my invention will be fully understood from the following detailed description of a typical preferred form and application of the invention, throughout which description reference is made to the accompanying drawings, in which:

Fig. 1 is a side elevation of a construction or assembly embodying the present invention, the several parts being shown in elevation and in a typical arrangement or relationship and serving to connect to pipes occurring in spaced parallel planes. Fig. 2 is a view of the parts illustrated in Fig. 1, showing the several sections apart to illustrate the sectional nature of the structure. Fig. 3 is an enlarged side elevation of a portion of the structure, showing a typical joint involving a male and female element, the upper portion of the structure illustrated being shown in central longitudinal section. Fig. 4 is a detailed transverse sectional view taken as indicated by line 4—4 on Fig. 3. Fig. 5 is a detailed transverse sectional view taken as indicated by line 5—5 on Fig. 3. Fig. 6 is a detailed transverse sectional view taken as indicated by line 6—6 on Fig. 3. Fig. 7 is an enlarged view of a portion of the structure shown in Fig. 3, showing the sealing means provided at the inner end of the race ring of the bearing, and Fig. 8 is an enlarged view of a portion of the structure shown in Fig. 3, showing the sealing means at the outer end of the race ring.

The joint construction or assembly provided by this invention is such that it can be used advantageously in many situations where fluids are to be handled and certain modifications and variations could be made to accommodate or best suit various operating conditions or classes of service. The construction involves, generally, a plurality of tubular flow handling sections, and in the particular case illustrated the construction connects to pipes, or the like, enabling them to tilt or rock relative to each other on an axis transverse of spaced planes in which the pipes are disposed and it enables one of the pipes to rotate freely about its longitudinal axis regardless of its position relative to the other.

The particular assembly illustrated in the drawings, and best shown on sheet 1 of the drawings, involves generally a female section A, a combination section B combining male and female elements, and a male section C. The combination section B is at the center or middle of the assembly, resulting in the sections A and C being at the ends thereof, and the sections A and C are provided at their outer ends with pipe receiving parts or connections 10. In the particular case illustrated, the pipe receiving parts 10 are internally threaded to receive lengths or sections of pipe P.

The end or terminal sections A and C of the assembly vary in character, that is, they are different in form, it being preferred that one be a simple straight section while the other is L-shaped. In the case illustrated, the female section A is L-shaped or is in the form of an L- fitting, whereas, the male section C is a simple straight tubular member.

In the case illustrated, the combination section B, which combines a male element and a female element, is an L-shaped member or fitting with the male element at one end and the female element at the other end so that these elements are at right angles to each other. It is preferred that the female portion or element of section A be the same in form, shape and construction as the female element of the combination section B, and it is further preferred that the male element of the section C be the same as the male element of the combination section B. With the parts thus related, the joint construction involved, where the male element of section C is engaged with the female element of section B, is the same as that which occurs where the male element of section B is engaged with the female element of section A. Since these joints or male or female connections are alike, the following description of one of them is equally applicable to the other.

The female element is characterized by a body portion 15 which may be in the nature of an enlargement having a socket entering it from its outer or exposed end 16. The socket is formed by a bore 17 entering the body 15 from the end 16, and a counterbore 18 smaller in diameter than the bore 17 and continuing inwardly from the bore 17 to terminate at a flat bottom 19 in a plane normal to that of the longitudinal axis of the joint.

The male element is characterized by a main portion 20 located within the bore 17 and a pin portion 21 projecting from the main portion 20 and located in the counterbore 18. The main portion 20 of the male element is preferably substantially coextensive with the bore 17 axially of the joint, and the pin portion 21, which is somewhat smaller in diameter than the main portion 20, preferably extends axially in the counterbore 18 the full length thereof. In the particular case illustrated, the pin portion 21 extends the entire length of the counterbore and its terminal end 22 is received in a recess 23 provided in the bottom 19 of the counterbore. With this construction the male element can be varied in position axially of the female element a substantial amount while maintaining the pin portion of the male element properly oriented in the counterbore. It is preferred, in practice, that the center longitudinal opening or passageway 25 that extends through the male element be of the same size and shape as the passageway 26 in the section having the female element.

The invention provides a bearing means E operating between male and female elements and relating them for free relative rotation. In accordance with the invention, the bearing means is engaged with or related to one of the elements so that it is in a fixed position axially thereof while it is engaged with or related to the other element to be shiftable or adjustable axially thereof. In the particular case illustrated, the bearing means E involves an anti-friction bearing preferably of the ball-bearing type. So far as the broader principles of the invention are concerned, the bearing means may vary widely in form and construction and it may, in practice, be desirable to vary the character of bearing or bearing construction depending upon the service to be performed thereby.

The particular anti-friction bearing shown in the drawings involves an annular series of balls 30 carried in an annular groove or channel 31 provided in the exterior of the main portion 20 of the male element. An annular race ring 32 surrounds the main portion 20 with clearance and has an inwardly facing groove or channel 33 therein receiving the balls 30. The race ring is provided with a laterally disposed access opening 35 that extends from the interior of the ring where the channel 33 occurs to the exterior of the ring and provides for passage of the balls into and out of the channels. A closure or plug 37 normally closes the access opening 35, and in the case illustrated, it is threaded into the opening.

In accordance with the present invention, the race ring 32 is shiftable or adjustable axially of the female element, and in the particular arrangement illustrated, it is carried in the bore 17 of the female element to be shiftable or adjustable longitudinally therein. The race ring 32 serves to communicate axial thrust from or between the bearing and the female element, and, in the preferred construction, it is threaded into the bore 17, the exterior of the race ring being provided with a thread that meshes or engages with a thread formed in the wall of the bore 17. Through this construction, rotation of the race ring 32 in the bore 17 causes the race ring to be shifted or adjusted axially of the bore and, as a result, the male element is adjusted or is varied somewhat axially of the female element.

A lock means is provided in connection with the race ring 32 to set it in adjusted position, and in the case illustrated, the lock means involves a lock plate 40 releasably secured to the female element as by means of a screw 41, and a tongue 42 projects from the plate 40 to engage circumferentially spaced axially projecting lugs 45 on the outer end of the race ring. This particular lock construction is clearly illustrated in Figs. 3 and 6 of the drawings.

The invention further provides sealing means in connection with the bearing construction above described, it being preferred to provide a sealing means that serves to maintain lubricant at the balls 30. In the case illustrated, the sealing means involves a sealing plate 50 at the outer end of the race ring 32 and a sealing plate 51 at the inner end of the race ring. The sealing plate 50 is an annular plate preferably somewhat cup-shaped and has its outer peripheral portion 52 in bearing engagement with a flange 53 on the exterior of the main portion 20 of the male element, while its outer peripheral portion 54 is engaged with the outer end of the race ring 32 where it is seated in a recess provided at 55.

The sealing plate 51 at the inner end of the race ring 32 is an annular plate preferably somewhat cupped in form and it has its inner peripheral portion 56 seated in the corner formed between the inner end 57 of portion 20 and the exterior of portion 21 where portion 21 joins portion 20. The outer peripheral portion 58 of the sealing plate 51 engages in the corner formed between a flange 59 projecting inwardly from the seat ring and the interior surface 60 of the seat ring in which the ball receiving channel 33 is formed. The details of the seals established by the plates 50 and 51 are illustrated in Figs. 7 and 8 of the drawings, and it will be apparent from these figures and from Fig. 3, how these seals serve to effectively maintain seals at the end of the race ring 32 without materially complicating the construction and without creating any appreciable friction or drag in the bearing.

A packing means G is provided in the joint between the male and female element thereof, and, in the preferred construction, means G is located in the counterbore 18 and it seals between the wall of the counterbore 18 and the exterior of the male element. In accordance with the present invention, the construction arrangement or formation of the packing means G may be varied slightly, it being contemplated that the packing means be held in place by the bearing means E and it being preferred that the packing means be adjustable to take up wear and that such adjustment be gained by operating or shifting the bearing means. In the particular case illustrated, the packing means G involves soft packing subject to operating under compression, and the desired pressure is established on and can be, from time to time, adjusted or established by adjusting the race ring 32 in the bore 17. The particular packing means G illustrated in the drawings involves a seat ring 60 arranged in the counterbore 18 to be supported by the bottom 19 thereof. A body of packing, preferably a plurality of superimposed packing rings 61, are supported on the seat ring 60 and as shown in the drawings they may be chevron-type rings sealing with the wall of the counterbore 18 and with the exterior of the pin portion 21 of the male element. A follower ring 65 slides on the counterbore and fits around the pin portion 21 with clearance. The follower engages the assembly of packing rings 61 and when advanced toward the packing rings it compresses them, causing them to seal with the wall of the bore and the exterior of the pin portion. In accordance with the present invention the parts are arranged and proportioned so that the inner end portion of the race ring 32 opposes the follower ring 65 and engages it as the race ring 32 is advanced in the counterbore 18.

With the construction thus described, the race ring 32 of the bearing means E can be readily set or positioned in the bore 17 so that the packing means G is under the desired pressure and, from time to time, as the packing rings 61 wear or need further compression, the race ring 32 can be adjusted or advanced in the bore and thus effect the desired adjustment of the packing. It is highly important to observe that the adjustment of the packing can be effected from the exterior of the structure and without taking the joint apart or disturbing any portion or parts thereof, save the locking means for the race ring 32 and the race ring itself.

In accordance with the preferred form of the invention, a lubricant handling fitting 70 is provided, preferably at the exterior of the female element, and this fitting passes lubricant, or the like, to the interior of the female element, preferably into the counterbore 18 where the follower ring 65 occurs. In the case illustrated, radially disposed channels 71 are provided in the end of the follower ring 65 that is engaged by the race ring 32. The channels serve to communicate lubricant passed by the fitting 70 to the interior of the race ring so that it reaches the packing rings 61 at the exterior of the pin portion 21 of the male element.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In combination, an elongate tubular female element with a socket therein terminating at a shoulder, an elongate tubular male element extending into the socket, a packing in the socket and surrounding the male element and sealing between the elements, the packing including spaced rigid end rings each slidably supported in the socket and packing rings between the end rings, one end ring being engaged with the shoulder, and a bearing between the elements and located in the socket outward of the packing and having a portion rotatably coupled to the male element against axial movement relative thereto and threaded in the socket and having pressure engagement with the other end ring of the packing, said other end ring fitting around the male element with clearance establishing an annular space and having radial recesses communicating with said space, there being a lubricant handling passage in the female element communication with said recesses for feed of lubricant thereto.

2. In combination, a female element with a socket therein terminating at a shoulder, a male element extending into the socket, packing in the socket and sealing with the male element, the packing including rigid end rings and packing rings between the end rings, one end ring being seated on the shoulder, and bearing means between the elements including an annular series of balls engaged around the male element in a fixed position axially thereof, and a race ring in the socket adjustable longitudinally thereof and engaged with the balls and with other end ring of the packing, and sealing means at the ends of the race ring sealing between the race ring and the male element, said other end ring fitting around the male element with clearance establishing an annular space and having radial recesses communicating with said space, there being a lubricant handling passage in the female element communication with said recesses for feed of lubricant thereto.

3. In combination, a female element with a socket therein, a male element extending into the socket, packing in the socket and sealing with the male element, the packing including rigid end rings and packing rings between the end rings, one end ring being seated on the shoulder, and bearing means between the elements including an annular series of balls engaged around the male element in a fixed position axially thereof and a race ring in the socket adjustable longitudinally thereof and engaged with the balls and having one engaged with the other end ring of the packing, the other end of the race ring having recesses therein adapted to receive a tool, lock means setting the ring in adjusted position, and sealing means at the ends of the race ring sealing between the race ring and the male element, the lock means including a plate engaged with the female element and extending into one of the recesses in the race ring, said other end ring fitting around the male element with clearance establishing an annular space and having radial recesses communicating with said space, there being a lubricant handling passage in the female element communication with said recesses for feed of lubricant thereto.

References Cited in the file of this patent

UNITED STATES PATENTS

| Number | Name | Date |
|---|---|---|
| 2,384,360 | Allen | Sept. 4, 1945 |
| 2,394,715 | Phillips | Feb. 12, 1946 |
| 2,396,123 | Phillips | Mar. 5, 1946 |
| 2,414,997 | Atkins | Jan. 28, 1947 |
| 2,489,441 | Warren | Nov. 29, 1949 |
| 2,531,021 | Bard | Nov. 21, 1950 |